March 21, 1967 M. A. LACE 3,310,697
SELF-STARTING SYNCHRONOUS MOTOR
Filed Nov. 18, 1964 2 Sheets-Sheet 1
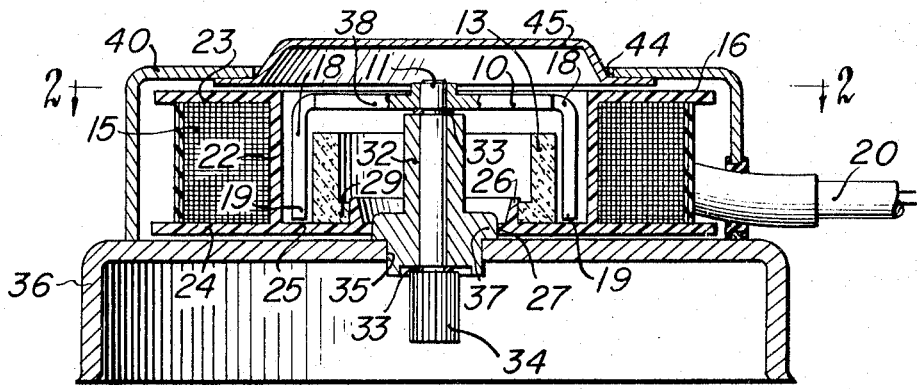
Fig. 1
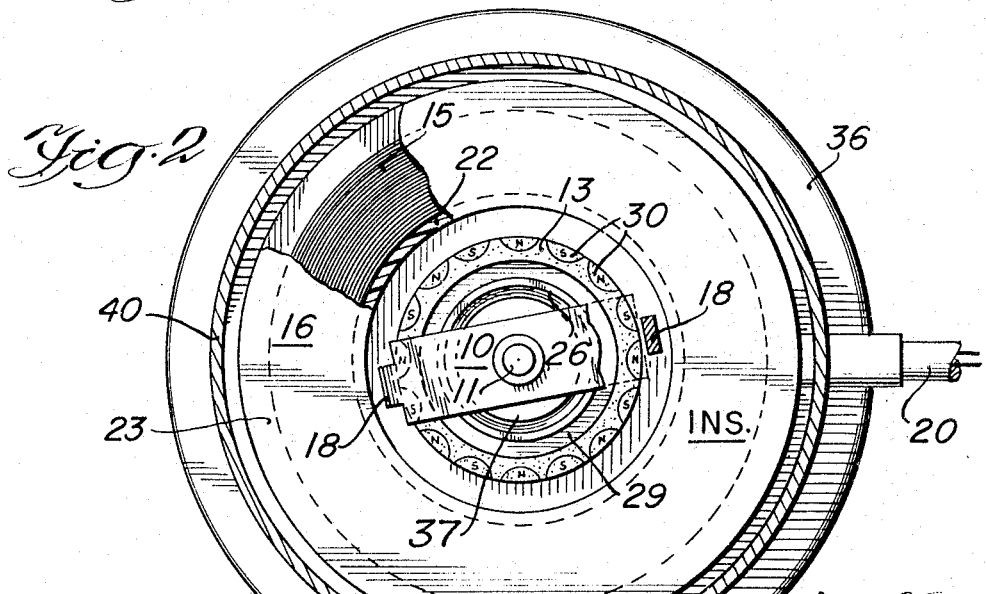
Fig. 2
Fig. 3
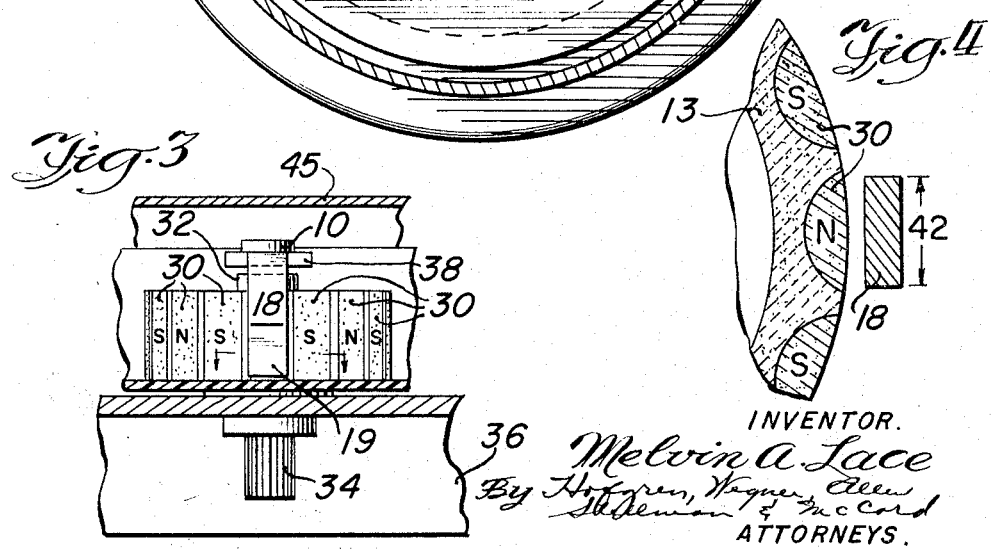
Fig. 4
INVENTOR.
Melvin A. Lace
By Hofgren, Wegner, Allen
Stellman & McCord
ATTORNEYS.

March 21, 1967  M. A. LACE  3,310,697

SELF-STARTING SYNCHRONOUS MOTOR

Filed Nov. 18, 1964  2 Sheets-Sheet 2

United States Patent Office 3,310,697
Patented Mar. 21, 1967

3,310,697
SELF-STARTING SYNCHRONOUS MOTOR
Melvin A. Lace, Prospect Heights, Ill., assignor to Oak Electro/Netics Corp., a corporation of Delaware
Filed Nov. 18, 1964, Ser. No. 411,986
13 Claims. (Cl. 310—164)

This invention relates to an electric motor, and more particularly to a self-starting synchronous motor.

One type of small synchronous motor, often used in clocks and timing devices, is constructed with a salient pole stator and a nonsalient permanent magnet rotor. By proper design of the flux path, the rest position of the rotor poles can be made substantially equidistant from the adjacent stator poles, producing a self-starting bi-directional motor. An example of such a motor is shown in Patent 3,059,131 to Everard et al. The motor illustrated in the Everard et al. patent has several inherent disadvantages. For example, upon energization, the rotor must accelerate a large mass, i.e., the permanent magnet. Due to the large moment of inertia of the rotor, the mass of the connected load must be low, or the starting torque high for the motor to start. A high torque motor requires a large energizing winding and should have a heavy rotor shaft. Furthermore, the sudden application of a large amount of torque, e.g. when the rotating shaft is started or stopped, may cause either the shaft to break or the permanent magnet to shear off from the shaft. By using the teachings of the present invention, it is possible to reduce the moment of inertia of the rotor, producing a self-starting motor without the disadvantages present in prior self-starting synchronous motors.

It is a principal object of this invention to provide an improved self-starting synchronous motor.

Another object of this invention is to provide a rotor for such a motor with a low moment of inertia.

One feature of this invention is the provision of a self-starting synchronous motor with a permanent magnet stator and a salient pole rotor.

Another feature of this invention is an improved motor construction wherein the number of salient poles is less than ½ the number of permanent magnet poles.

A further feature of this invention is a self-starting synchronous motor of compact size and simple and economic construction.

A still further feature of this invention is a self-starting synchronous motor constructed with an annular permanent magnet stator, an encircling winding for producing an alternating magetic field, and a rotor having salient poles interposed between the encircling winding and the annular stator, the salient poles forming a partial flux path for the alternating magnetic field.

Further features will be apparent in the following specification and in the drawings in which:

FIGURE 1 is a section view through the axis of a motor embodying the invention;

FIGURE 2 is a transverse sectional view thereof, taken along line 2—2 of FIGURE 1;

FIGURE 3 is a fragmentary side view of the motor of FIGURE 2, with the salient poles rotated from the rest position to a position directly in front of opposite stator poles;

FIGURE 4 is an enlarged section of a portion of the stator and rotor shown in FIGURE 3;

Figure 6:
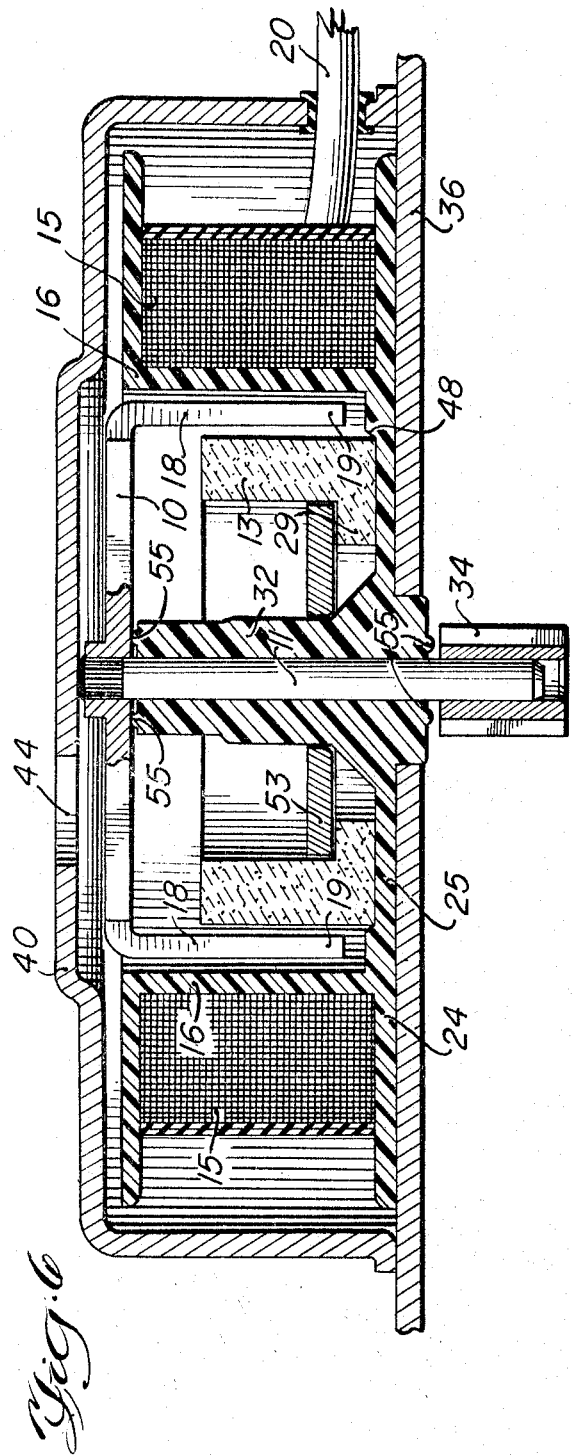
FIGURE 6 is a sectional view, similar to FIGURES 1 and 5, of a further embodiment of the invention.

While illustrative embodiments of the invention are shown in the drawings and will be described in detail herein, the invention is susceptible of embodiment in many different forms and it should be understood that the present disclosure is to be considered as an exemplification of the principles of the invention and is not intended to limit the invention to the embodiments illustrated. The scope of the invention will be pointed out in the appended claims.

As seen in FIGURES 1 and 2, the bi-directional synchronous motor is constructed with a salient pole rotor 10 secured to a rotatable shaft 11. A permanently magnetized stator 13 provides a stationary magnetic field in the vicinity of the rotor 10. A winding 15 for producing an alternating magnetic field, wound on a bobbin 16, encircles the rotor 10 and stator 13. The rotor 10 has salient poles 18, and free ends 19 of which extend between the encircling winding 15 and the permanently magnetized stator 13. An A.C. voltage is applied to the winding 15 through a lead 20, producing a magnetic field that alternates with the frequency of the applied voltage. This alternating magnetic field simultaneously magnetizes all the free ends 19 of the rotor 10 with a magnetic polarity that continuously alternates between magnetic north and south poles. The magnetic field produced in the free ends 19 of salient poles 18 interacts with a stationary magnetic field of stator 13 to produce a torque which causes the rotor 10 to rotate about its shaft 11.

The bobbin 16 is constructed of an upstanding cylindrical wall 22 that is parallel with the shaft 11. Extending radially outward from the ends of the cylindrical wall 22 are a top wall 23 and bottom wall 24. The walls 22, 23, and 24 form a channel, the cross section of which is U-shaped, containing the winding 15 of the motor. The bottom wall 24 has a portion 25 extending inwardly from the cylindrical wall 22. This portion 25 of the bottom wall 24 has an annular upstanding rib 26 thereon and a central circular aperture 27 spaced inwardly from the rib 26.

The cup-shaped stator 13 is positioned concentrically about shaft 11 by the abutment of its inwardly extending flange 29 with the upstanding rib 26 of bobbin 16. As shown more clearly in FIGURE 2, the stator 13 is composed of a material that has been permanently magnetized in localized regions around its periphery to form adjacent areas 30 of opposite magnetic polarity. These areas 30 form magnetic north and magnetic south poles.

Shaft 11 is mounted in a bearing assembly 32. At the top end of shaft 11 the rotor 10 may be secured thereon by any suitable means, e.g. crimping. The rotor 10 is raised above the top surface of bearing assembly 32 by means of the thrust washer 33. The bottom end of shaft 11 is secured in any suitable manner to a gear 34. Between gear 34 and bearing 32 is another thrust washer 33. Bearing assembly 32 has an enlarged section 35 that extends through a circular opening in a bottom plate 36. During the assembly of the motor, the bearing assembly 32 is staked to the bottom plate 36, after which bobbin 16 is press fit over a flange 37 on the bearing assembly 32 to tightly engage the edge wall around the central aperture 27 of the bottom wall 24.

The U-shaped rotor 10 is composed of a central portion 38 that is secured to the shaft 11. The central portion 38 extends radially outward to downwardly extending salient poles 18 that are parallel to shaft 11. As seen best in FIGURE 1, salient poles 18 have free ends 19 which extend into the space between the bobbin 16 and the cup-shaped permanent magnet stator 13.

Connected to bottom plate 36 is a cover 40 which provides an enclosure for the synchronous motor and a partial flux path for the magnetic field produced by winding 15.

In FIGURES 3 and 4 the rotor 10 has been rotated about shaft 11 so that the mid-section of salient pole 18 is directly in front of the mid-portion of one of the stator poles 30. Salient pole 18 has a width 42 that is preferably approximately equal to the width of a single magnetic pole 30 of the permanent magnet 13.

Any rest position of rotor 10 is possible in which the salient poles 18 are midway between adjacent north (N) and south (S) poles 30 of the permanent magnet stator 13, as illustrated in FIGURE 2. Salient poles 18 will assume this rest position because it represents the path of minimum reluctance when winding 15 is not energized. When an A.C. voltage energizes winding 15, a magnetic flux field will form which will magnetize all the free ends 19 of salient poles 18 with an identical magnetic polarity. Thus, free ends 19 will assume either a north or south magnetic polarity, depending upon the direction of the applied magnetic field, which in turn depends upon the instantaneous direction of the applied A.C. voltage. If the magnetic field causes the ends 19 to assume a magnetic north orientation, the rotor 10 will begin to rotate in a counter-clockwise direction as viewed in FIGURE 2. Likewise, if the applied magnetic field is such to induce identical south poles in the ends 19 of the salient poles 18, rotor 10 will begin to rotate in a clockwise direction as viewed in FIGURE 2. Thus, the synchronous motor described is bi-directional, the direction of rotation at the start when energized depending upon the direction of the instaneous applied A.C. voltage. If only unidirectional rotation is desired, a suitable "no back" device (not shown) may be connected to shaft 11 of the motor.

With the instant synchronous motor it is not necessary that the number of salient poles be ½ the number of permanent magnet poles, as has been conventional heretofore in self-starting synchronous motors. In the illustrated embodiment the synchronous motor is provided with two salient poles and sixteen permanent magnet poles. The light weight rotor 10 is easily accelerated when the motor is excited. Furthermore, the rotor construction is extremely rugged and can be securely connected to shaft 11. Due to the novel construction of this motor, failure resulting from the sudden application of a large amount of torque is virtually impossible. Furthermore, the compact construction resulting from the location of the salient pole rotor and permanent magnet stator inside the encircling winding producing the magnetic flux field allows this motor to be used in many applications where space is extremely limited.

Prior motors having permanent magnet rotors present a practical design problem which is solved with the present construction. The rotor of a motor must be accurately balanced and must be capable of secure mounting on a rotor shaft. These requirements effectively preclude use of ceramic magnets in a rotating magnet motor as the ceramic is difficult to balance and to mount, at a reasonable price in labor and materials. Molded plastic rotors of a magnetic material have been used. However, the magnetic field strength of molded magnets is only a fraction of that of a ceramic magnet of the same mass. In some instances with prior motors, the mass of the rotor magnet is so great and the magnetic field strength so small that insufficient torque is developed for satisfactory operation.

In the present motor the stationary permanent magnet may be of a permanent ceramic material providing the high field strength which is desirable. Furthermore, the physical dimensions of the magnet are not critical as it does not have to be balanced and, with the high field strength, the air gap may be greater than if the field strength were less. This permits use of low cost magnets.

In the embodiment of the invention shown in FIGURES 1-4, the central portion 38 of rotor 10 has a width that is approximately equal to twice the width of the salient pole 18, hence twice the width of a single pole 30 of the permanent magnetic stator 13. While the illustrated embodiment is preferred, to reduce the reluctance of the magnetic path, the invention is not to be limited to the particular construction shown in the diagrams. For example, the width of central portion 38 can be the same as the width of the salient poles 18, allowing the rotor 10 to be simply and economically manufactured from a single length of magnetically polarizable material.

During the assembly of this synchronous motor it is desirable to be able to check visually for rotation of rotor 10 after the cover 40 is placed over the synchronous motor and before it is permanently secured to bottom plate 36. For this purpose, an aperture 44 is provided in a portion of the cover 40, as is conventional in the art. This aperture 44 may be left open or may be covered with a nonmagnetic translucent material. In FIGURE 1, a cup-like translucent plastic cup 45 is inserted in aperture 44 and secured at its ends to cover 40. Plastic cup 45 must be limited in size, for it is important that cover 40 extend near the salient poles 18 in order to complete the low reluctance path for the alternating magnetic field.

Figure 5:
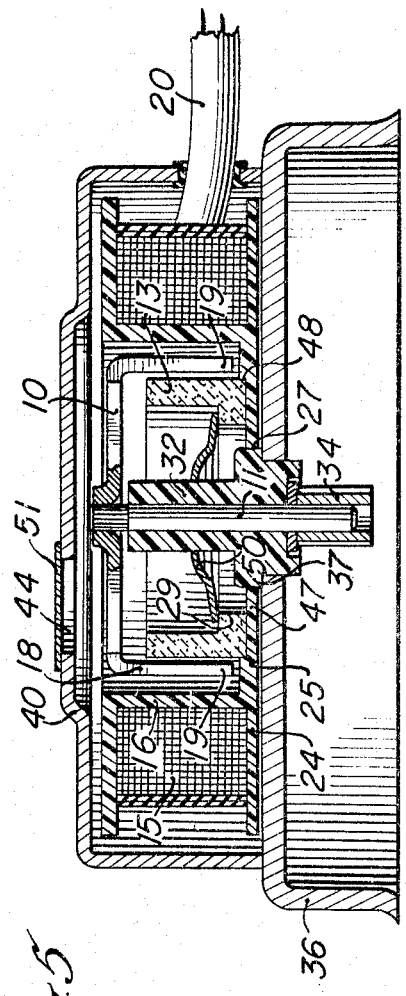
FIGURE 5 is a sectional view, similar to FIGURE 1, of another embodiment of the invention.

In FIGURES 5 and 6 further embodiments of the motor utilizing the principles of the invention are shown. Parts identical to those described in connection with the first embodiment of the motor have been designated with the same numerals used in connection with FIGURES 1-4. As in FIGURE 1, the synchronous motors are constructed with a rotor 10 having salient pole projections 18 magnetically polarized by the alternating magnetic field produced by the current in winding 15. The free ends 9 of the salient poles 18 extend into the space between the bobbin 16 and a permanently magnetized stator 13.

In FIGURE 5, the bobbin 16 has a bottom wall 24 with a radially inwardly extending portion 25 that forms an aperture 27, similar to that illustrated in FIGURE 1. A portion 47 that is adjacent the aperture 27 is reduced in cross section. The reduced cross section has an upwardly extending shoulder 48 which abuts the lower periphery of the permanent magnet stator 13 to locate the stator 13 in a position concentric with shaft 11. The cup-shaped stator 13 is secured to the bottom portion 25 of bobbin 16 by means of a clip 50 urged down over the bearing assembly 32. The ends of the clip 50 press against the internal flange 29 of stator 13. As in FIGURE 1, bobbin 16 has a press fit over the annular flange 37 of the bearing assembly 32, and bearing 32 is staked to the bottom plate 36. In order to check for rotation of rotor 10 when the cover 40 is placed over the motor, an aperture 44 has been provided through the cover 40. This aperture is displaced from the central axis. The aperture 44 is covered with a translucent plastic material 51 that is secured to cover 40.

In FIGURE 6 a more simplified construction of the synchronous motor is illustrated in which the bearing assembly 32 and the bobbin are constructed from a single piece of molded plastic. The plastic preferably used is a mixture of the plastic product sold under the trademark Delrin and the plastic product sold under the trademark Teflon. The bottom portion 25 of the molded plastic structure has a shoulder 48 that is used to position the permanent magnet stator 13 about the shaft 11. The cup-shaped stator 13 is secured to the bottom wall 24 of the molded structure by means of a plastic washer 53 forced over the bearing assembly 32. The outer portion of the bottom section of plastic washer 53 presses against the internal flange 29 of the stator 13. The thrust washers necessary in the other embodiments have been eliminated in FIGURE 6 by providing an annular bearing rib 55 on the top-most and bottom-most surface of the molded plastic assembly.

I claim:

1. A self-starting synchronous motor comprising: a winding for producing an alternating magnetic field, encircling a bobbin disposed about a central axis, said bobbin having a cylindrical aperture; an annular permanent magnet stator within said aperture and spaced about said central axis, said stator having a periphery which is composed of adjacent sections of opposite magnetic polarity; a U-shaped rotor disposed to rotate about said central axis, said rotor being composed of a central portion extending generally perpendicular to said axis with salient poles projecting therefrom generally parallel to said axis, said salient poles having free ends which are interposed between said bobbin and said annular stator, and means including said salient poles for completing a low reluctance path for said alternating magnetic field.

2. The synchronous motor of claim 1 wherein said central portion is planar, and has a salient pole projecting from opposite ends thereof.

3. The synchronous motor of claim 2 wherein the width of a salient pole is substantially equal to the width of one pole section of said stator and the width of said central portion is approximately twice the width of said salient pole.

4. The synchronous motor of claim 1 wherein the number of said salient poles is less than ½ the number of said adjacent sections of said stator magnet.

5. The synchronous motor of claim 1 wherein said bobbin has a surface with shoulder means thereon which position said annular stator.

6. The synchronous motor of claim 5 wherein said stator has an annular surface, and the bobbin has a surface with upstanding annular shoulder means thereon, wherein said annular surface abuts said shoulder means to position said stator.

7. In a self-starting synchronous motor having means for producing an alternating magnetic field and means for producing a stationary magnetic field, rotor disposed to rotate about a central axis comprising: a central portion extending generally perpendicular to said central axis, said central portion having projecting salient poles extending therefrom generally parallel to said central axis, said salient poles having free ends that are alternately and simultaneously magnetized with identical magnetic polarities by said alternating magnetic field, wherein the forces produced by the interaction of the magnetic polarity of said free ends with said stationary magnetic field causes said rotor to rotate about said central axis.

8. In a self-starting synchronous motor having means for producing an alternating magnetic field and means including a plurality of magnetic poles for producing a stationary magnetic field, a rotor disposed to rotate about a central axis comprising: a central portion extending perpendicular to said central axis, said central portion having projecting salient poles extending therefrom generally parallel to said central axis, the number of said salient poles being less than ½ the number of said magnetic poles for producing said stationary magnetic field, said salient poles having free ends that are alternately and simultaneously magnetized with identical magnetic polarities by said alternating magnetic field, wherein the forces produced by the interaction of the induced magnetic polarity of said free ends with said stationary magnetic field causes said rotor to rotate about said central axis.

9. The rotor of claim 8 wherein the width of each of said salient poles is substantially equal to the width of one of said magnet poles for producing said stationary magnetic flux field.

10. The rotor of claim 9 wherein the width of said central portion is substantially equal to twice the width of one of said salient poles.

11. A self-starting synchronous motor comprising: a plate having a circular aperture therein; cylindrical bearing means having an enlarged annular shoulder thereon, a portion of said bearing means extending through the circular aperture of said plate; a shaft having a central axis, positioned within said cylindrical bearing means; a bobbin having a cylindrical wall concentric with said central axis and a top and a bottom wall extending radially from the ends of said cylindrical wall, said bottom wall having an inwardly extending portion with an annular upstanding rib thereon and a central circular aperture spaced inwardly from said rib, said enlarged annular shoulder of said bearing means extending through the central aperture of said bottom wall, positioning said bobbin around said central axis by the abutment of said shoulder with said bottom wall, said top wall and a portion of said bottom wall extending radially outward from the ends of said cylindrical wall, said walls forming a channel therebetween; a winding for producing an alternating magnetic field, contained in said channel; a hollow cylindrical permanent magnet stator, composed around its periphery of adjacent magnetic poles of opposite magnetic polarity, said stator having a surface which abuts said annular rib to position said stator concentrically around said central axis; a U-shaped rotor comprising a central portion connected to said shaft and extending radially outward therefrom, salient poles projecting perpendicularly from said central portion parallel to said central axis, said salient poles having free ends which are interposed between the cylindrical wall of said bobbin and the cylindrical permanent magnet stator; and a cover surrounding said bobbin and attached to said plate, said cover and said salient poles forming a portion of a low reluctance path for said alternating magnetic field.

12. A self-starting synchronous motor comprising: a plate having a circular aperture therein; mounting means, having a central cylindrical portion forming bearing means, a portion of said bearing means extending through the circular aperture of said plate; a shaft having a central axis, positioned within said cylindrical bearing means; said mounting means having a first wall extending radially outward from its central cylindrical portion, said first wall having an annular upstanding rib thereon and, spaced outwardly from said rib, an upstanding cylindrical wall concentric with said central axis, said cylindrical wall having a radially outward extending portion forming a second wall parallel to said first wall, said second wall, said cylindrical wall, and a portion of said first wall extending outwardly from said cylindrical wall forming a channel therebetween; a winding for producing an alternating magnetic field, contained in said channel; a hollow cylindrical permanent magnet stator, composed around its periphery of adjacent magnetic poles of opposite magnetic polarity, said stator having a surface which abuts said annular rib to position said stator concentrically around said central axis; a U-shaped rotor comprising a central portion connected to said shaft and extending radially outward therefrom, salient poles projecting perpendicularly from said central portion parallel to said central axis, said salient poles having free ends which are interposed between the cylindrical wall of said bobbin and the cylindrical permanent magnet stator; and a cover surrounding said mounting means and attached to said plate, said cover and said salient poles forming a portion of a low reluctance path for said alternating magnetic field.

13. The motor of claim 12 wherein the end portion of said bearing means adjacent said rotor has an annular rib extending therefrom concentric with said central axis, said rib serving as a bearing surface for said rotor.

No references cited.

MILTON O. HIRSHFIELD, *Primary Examiner.*

L. L. SMITH, *Assistant Examiner.*